US006021406A

United States Patent [19]
Kuznetsov

[11] Patent Number: 6,021,406
[45] Date of Patent: Feb. 1, 2000

[54] METHOD FOR STORING MAP DATA IN A DATABASE USING SPACE FILLING CURVES AND A METHOD OF SEARCHING THE DATABASE TO FIND OBJECTS IN A GIVEN AREA AND TO FIND OBJECTS NEAREST TO A LOCATION

[75] Inventor: Vladimir E. Kuznetsov, Cupertino, Calif.

[73] Assignee: Etak, Inc., Menlo Park, Calif.

[21] Appl. No.: 08/970,999

[22] Filed: Nov. 14, 1997

[51] Int. Cl.$^7$ ...................................................... G06F 17/30
[52] U.S. Cl. ........................................ 707/6; 707/3; 707/2
[58] Field of Search ...................... 707/3, 104; 235/494; 395/161; 364/424.04; 382/168, 266

[56] References Cited

U.S. PATENT DOCUMENTS

| | | | |
|---|---|---|---|
| 5,329,108 | 7/1994 | Lamoure | 235/494 |
| 5,416,312 | 5/1995 | Lamoure | 235/494 |
| 5,524,202 | 6/1996 | Yokohama | 395/161 |
| 5,557,524 | 9/1996 | Maki | 364/424.04 |
| 5,588,071 | 12/1996 | Schultz | 382/168 |
| 5,602,943 | 2/1997 | Celho et al. | 382/266 |
| 5,710,915 | 1/1998 | McElhiney | 707/3 |
| 5,884,320 | 3/1999 | Agrawal et al. | 707/104 |

OTHER PUBLICATIONS

Sierpinski, W., "Sur Une Novelle Courbe Continue Qui Remplit Toute Une Aire Plaine," *Bulletin International De L'Acadèmie Des Sciences de Cracovie*, Ser. A., 462–478, (1912).

Bially, Theodore, *Space–Filling Curves: Their Generation and Their Application to Bandwidth Reduction*, IEEE Transations on Information Theory, vol. II–15, No. 6, Nov. 1969, pp. 658–664

Butz, Arthur, R., *Alternative Algorithm for Hilbert's Space–Filling Curve*, IEEE Transactions on Computers, Apr. 1971, pp. 424–426.

Butz, Arthur, R., *Convergence with Hilbert's Space–Filling Curve*, Journal of Computer and System Sciences: 3, 128–146, (1969).

*Primary Examiner*—Wayne Amsbury
*Assistant Examiner*—Thuy Pardo
*Attorney, Agent, or Firm*—Fliesler, Dubb, Meyer & Lovejoy

[57] ABSTRACT

A method for storing map data in a database and a method of searching the database to find objects in a given area and to find objects nearest to a location. To generate the map data, a map plane is divided into a number of squares and the squares are numbered with spatial key numbers according to a space filling curve. Objects identifying places such as restaurants or hotels are placed in a main table of the database along with one of the spatial keys (object keys) intersecting an area of the map occupied by the object. A secondary table of the database is then created with one column including object keys corresponding to the main table, and other columns identifying ranges of spatial keys for objects identified by the object keys. To search the database to find objects in a given area, ranges of spatial keys are calculated for the given area and compared with ranges in the secondary table to identify object keys. The object keys identified are then used to obtain the desired objects from the main table.

14 Claims, 3 Drawing Sheets

SECONDARY TABLE

| object key | range | |
|---|---|---|
| $k_3$ | $k_0$ | $k_3$ |
| $k_3$ | $k_{12}$ | $k_{15}$ |
| $k_{25}$ | $k_{24}$ | $k_{27}$ |
| $k_{25}$ | $k_{36}$ | $k_{39}$ |
| $k_{50}$ | $k_{48}$ | $k_{51}$ |
| $k_{62}$ | $k_{60}$ | $k_{63}$ |

MAIN TABLE
| object key | object |
|---|---|
| $k_3$ | $O_1$ |
| $k_{25}$ | $O_2$ |
| $k_{50}$ | $O_3$ |
| $k_{62}$ | $O_4$ |
FIG. 4
SECONDARY TABLE
| object key | range | |
|---|---|---|
| $k_3$ | $k_0$ | $k_3$ |
| $k_3$ | $k_{12}$ | $k_{15}$ |
| $k_{25}$ | $k_{24}$ | $k_{27}$ |
| $k_{25}$ | $k_{36}$ | $k_{39}$ |
| $k_{50}$ | $k_{48}$ | $k_{51}$ |
| $k_{62}$ | $k_{60}$ | $k_{63}$ |
FIG. 5
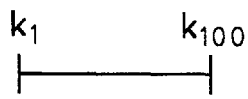
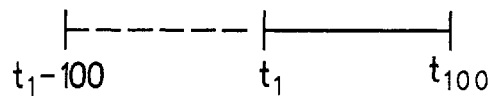
FIG. 6

METHOD FOR STORING MAP DATA IN A DATABASE USING SPACE FILLING CURVES AND A METHOD OF SEARCHING THE DATABASE TO FIND OBJECTS IN A GIVEN AREA AND TO FIND OBJECTS NEAREST TO A LOCATION

BACKGROUND OF THE INVENTION

1. Field of the Invention

The present invention relates to a method of placing map data into a database. The present invention further relates to searching a map database to find objects within a given location and to find objects nearest a given location.

2. Description of the Background Art

Electronic maps typically store data identifying geographic areas along with data identifying objects referenced to the geographic areas. Objects identified in the map can include restaurants, gas stations, hotels, camp grounds, post offices, grocery stores and other places which a traveler may desire to locate in a geographic area.

For a map area of any significant extent, the object data can occupy hundreds of megabytes of memory space. In order to hold such vast quantities of map data economically, map data is typically stored on storage devices such as CD-ROMs or hard drives. To allow ease of locating particular data, the geographic data is typically divided into blocks, and data for each block is then separately stored in a storage device. Individual data blocks are typically linked by additional data to form a tree type structure with individual data blocks identified at the bottom of the tree, and groups of data blocks linked together farther up the tree, the groups progressing up the tree linking more data blocks until the top of the tree is reached where all data blocks of a map are linked together. With such a tree structure identifying and linking data blocks, if a user desires to access data in an area covering multiple data blocks, the data can be easily retrieved.

Objects are typically stored in the data blocks in the database in relation to their geographic location on a map. Thus, if a new object is added to a map, the new object data must be stored in a particular location within a block of data. Because of space limitations on a CD-ROM or hard drive, if a block of data with the newly added object becomes too large for the area of the storage device in which it is allocated, the block of data may be divided into two blocks. One of the separated blocks may then need to be located in a totally different area of the storage device. Such a change in data blocks can increase access time when locating data.

An example of a user request for data in the data blocks might be a request to find all post offices within a five square mile area. A conventional method used to find such objects would be to access the data blocks, starting with data at the top of the tree and proceeding down the tree to narrow the number of blocks requested until all data blocks are identified covering the five square mile area. All objects in the located data blocks are then retrieved from memory and their location from the current position of the user are calculated based on stored coordinates for each object. Objects which are outside the desired area are then typically discarded, and the remaining objects which are within the five square mile area can be displayed.

A request to find the nearest post office to the users current location typically proceeds in a similar manner. First, one or more data blocks are retrieved from memory which include the users current location, and all objects identifying post offices within the one or more blocks are identified. If the data blocks originally retrieved do not include any of the desired objects, additional data blocks are retrieved surrounding the originally retrieved data blocks and the search repeated until objects are located. Coordinates of located objects are then used to determine which object is the closest to the user.

With objects occupying as much as eight kilobytes each, a search through blocks of data to obtain object data can take a significant amount of time. Further, with a significant number of objects located in blocks identified in a search, calculations to determine which objects are within a given area, or which objects are closest to a users location can take a significant amount of time.

SUMMARY OF THE INVENTION

The present invention enables objects to be stored in a database without a relationship to how the objects are geographically located while still enabling object data to be rapidly located during a search.

The present invention further enables objects to be identified in a given search area without requiring a significant number of objects to be retrieved and later discarded which are not within the given search area.

The present invention further enables identification of objects in a given area, or objects closest to a users location without requiring the amount of calculations to determine object locations as in conventional methods.

The present invention includes a method for generating and storing map data in a database and includes dividing a map plane into a number of squares and numbering the map squares with spatial key numbers according to a space filling curve. The space filling curve provides a one dimensional representation of the two dimensional map and enables identification of areas of the map using ranges of spatial key numbers.

The method of storing map data of the present invention continues by creating two tables, a main table and a secondary table which are stored in the database. Data for an object is placed in each row of the main table along with one of the spatial keys intersecting an area of the map occupied by the object. Such a spatial key is referred to as an object key.

The secondary table of the database is then created with each row including an object key corresponding to an object key in the main table and a corresponding range of spatial keys which intersect the area occupied by an object identified by the object key. The secondary table includes rows identifying the ranges of spatial keys covering the entire area intersected by each object in the main table.

The present invention further includes a method to search the database created to find all objects in a given area. To find all objects in a given search area, ranges of spatial keys are calculated for the given search area and compared with ranges in the secondary table to identify object keys. The object keys identified are then used to obtain corresponding objects from the main table which intersect the given search area.

The present invention further includes a method to search the database created to find objects nearest to a particular location. To find one or more objects nearest a location, a search is performed in iterations, with a search area being a circle having a radius initially covering one square, the radius then being doubled in each iteration to redefine the search area. Ranges of spatial keys are calculated for the search area for each iteration and each search area range is compared with the object ranges in the secondary table to locate intersecting ranges. Object keys for the object ranges which are identified in a search area range are then utilized to identify objects in the main table. Once a desired number of objects are located with ranges intersecting search area ranges, the search area radius is redefined to the radius of the farthest desired object located. Searching then continues in iterations with the search area radius being reduced in each iteration where closer desired objects are located until only the nearest objects requested remain.

By iteratively increasing the search area to retrieve objects until more than enough objects are found, and then iteratively decreasing the search area to eliminate undesired objects, retrieval of a significant number of objects from the main table and calculation of their locations from a particular search location can be avoided, potentially saving a significant amount of search time relative to conventional methods.

BRIEF DESCRIPTION OF THE DRAWINGS

Further details of the present invention are explained with the help of the attached drawings in which:

FIG. 4 shows a main table of the present invention;

FIG. 5 shows a secondary table of the present invention; and

FIG. 6 provides spatial key identification lines illustrating a method of the present invention.

DETAILED DESCRIPTION

Figure 1:
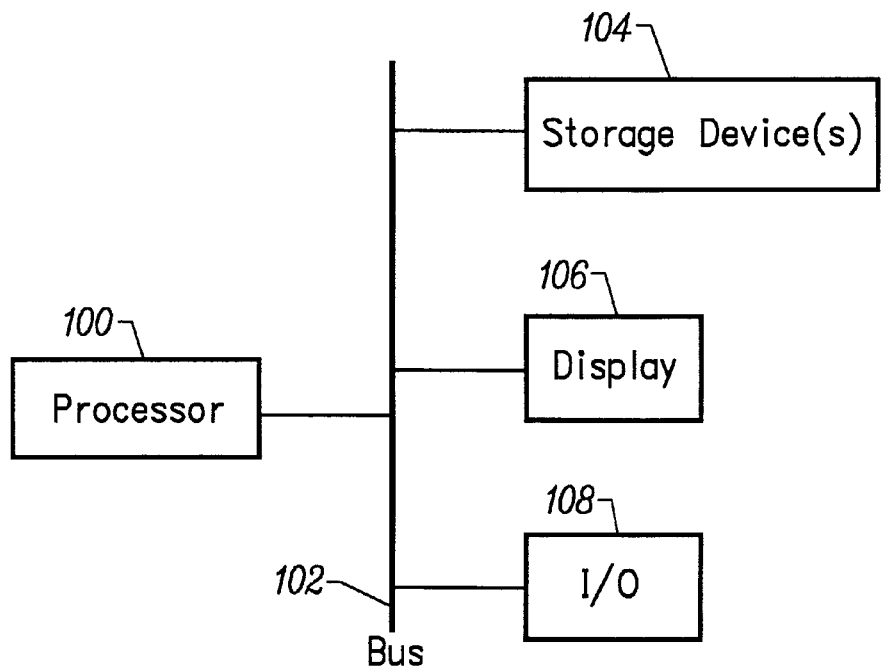
FIG. 1 shows a block diagram of hardware utilized with the present invention.

FIG. 1 shows a block diagram of hardware utilized with the present invention. The hardware includes a processor 100 which may be an Intel Pentium Processor, or other suitable processor. The processor 100 has address, data and control lines which are connected to bus 102. Also connected to the bus 102 are one or more storage device(s) 104, a display device 106 and an I/O device 108. The storage device(s) 104 can include one or more of a hard drive, a CD-ROM, a read only memory device (ROM), random access memory (RAM), or other types of storage devices which can store electronic map data and which can be accessible by the processor 100. The display 106 can be a CRT monitor, a LCD display, or other display device which the processor 100 utilizes to display map data and other user information. The I/O device 108 can be a keyboard, keypad or other device enabling a user to communicate with the processor.

A. Creating and Storing Data In A Data Base Using Space Filling Curves

The method of creating and storing data of the present invention begins by breaking a geographic plane into a rectangular grid of squares, and numbering the squares in an order dictated by a space filling curve. Space filling curves were invented by mathematicians to transform a multidimensional item, such as a two dimensional map, into a one-dimensional item which is generally more mathematically manageable. D. Hilbert and G. Peano originally developed space filling curves for mapping a one-dimensional coordinate to every point in a two dimensional structure. For an article providing an algorithm for the Hilbert space filling curve, see, A. R. Butz, "Convergence with Hilbert's Space Filling Curve," *J. Comput. Sys. Sci.*, vol. 3, May 1969, pp. 128–146, incorporated herein by reference. For alternative algorithms for space filling curves, see A. R. Butz, "Alternative Algorithm for Hilbert's Space-Filling Curve," *IEEE Transactions on Computers*, C-20 (1971), 424–426; and W. Sierpinski, "Sur une novelle courbe qui remplit toute une air plaine," Bull. Adad. Sci. Cracov. Ser. A., (1912), 462–478.

Figure 2:
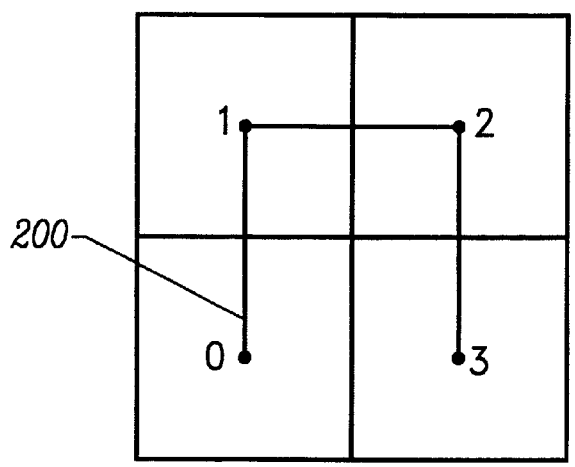
FIG. 2 illustrates breaking a two-dimensional map plane into four squares and characterization of the squares using a space filling curve.

FIG. 2 illustrates breaking a two-dimensional map plane into four squares and characterization of the squares using a space filling curve 200. The space filling curve includes lines connecting the centers of squares. Points at the ends of the lines forming the space filling curve are numbered, here with numbers 0–3. Such numbering of points on the space filling curve also provides numbering for the squares in the two-dimensional plane. The numbers, such as 0–3, corresponding to points on the space filling curve are referred to herein as spatial keys.

A characteristic of identifying the squares using a space filling curve is that if two squares have spatial keys which have consecutive numbers, then the squares are neighbors on a plane. The symmetrical statement that if two squares are neighbors they will have consecutive numbers is not always true, as can be seen referring to squares 0 and 3. However, the feature that consecutive spatial key numbers identify neighboring squares provides a significant advantage in identifying the location of a groups of squares on a map plane for the method of present invention.

Figure 3:
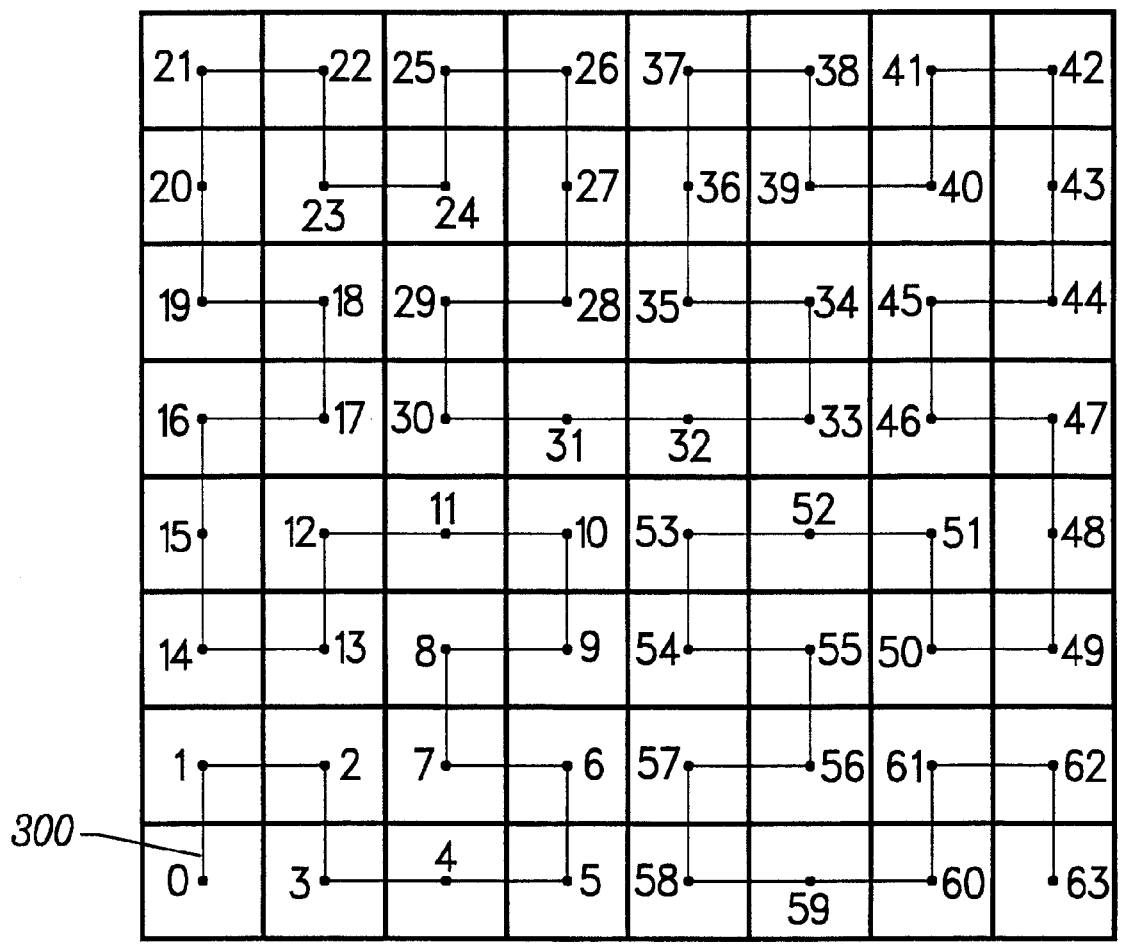
FIG. 3 illustrates dividing a map plane into sixty-four squares and characterization of the squares using a Hilbert space filling curve.

FIG. 3 illustrates a map plane divided into sixty-four squares and characterization of the squares using a Hilbert space filling curve 300. In addition to the property of consecutive spatial key numbers identifying neighboring squares, FIG. 3 illustrates the property of a space filling curve that if two squares have numbers close in value, then these two squares are close on the plane. The symmetrical statement that if two squares are close on the plane they have spatial key numbers close in value is not always true, as can be seen from squares having spatial keys 5 and 58. However, the property that two squares having spatial key numbers close in value are close on a plane will provide an advantage in identifying the location of groups of squares on a map plane for the method of the present invention.

Another feature of using a space filling curve to characterize a map plane is that ranges of spatial keys can be utilized to identify areas of the map plane. For example, the range 1–31 identifies the left half of the plane of FIG. 3, while the ranges 1–15 and 48–63 identify the bottom half of the plane of FIG. 3. Using ranges, as opposed to individual numbers, enables data to be more economically stored in a database and searched using the present invention.

The present invention utilizes a processor to divide a map plane into squares and to calculate and assign spatial keys to the squares. The processor can be a special unit utilized to identify and place map data onto a CD-ROM or other storage device, or it can be the processor 100 of FIG. 1. In the present invention, the processor preferably utilizes the Hilbert algorithm to provide a space filling curve for identifying squares of a map plane, but other algorithms for space filling curves, such as the Sierpinski curve, may likewise be utilized.

The present invention further utilizes a standard data base management system to keep track of data in tables. The tables are stored in the storage device 104 of FIG. 1, while the data base management system can reside in a control processor for storage device 104, or in processor 100. A table includes a rectangular set of data with rows and columns. Some columns in the table can have a corresponding index provided in the data base management system to allow a quick random access to rows in the column of the table.

The present invention utilizes two tables, a main table as illustrated in FIG. 4 and a secondary table as illustrated in FIG. 5. Both the main table and secondary table are stored in storage device 104 of FIG. 1.

Objects, represented as $O_1$–$O_4$, are included in one column of the main table of FIG. 4. As indicated previously, objects contain data identifying places on a map such as restaurants, gas stations, hotels, camp grounds, post offices, etc, and can include up to 8 kilobytes of information each. The objects stored in the main table can reference a place intersecting an area of a map plane which includes one or more squares identified by spatial keys. One spatial key which intersects with each object is selected and stored in a row of the main table with its corresponding object. The spatial key assigned to identify an object in the main table is referred to as an object key. For example, the object $O_1$ intersects a square on a map plane identified by a spatial key $k_3$. The spatial key $k_3$ is, thus stored in a row with object $O_1$ in the main table of FIG. 4. Similarly, object $O_2$ is stored in a row of the main table of FIG. 4 with an identifying object key $k_{25}$ which it intersects. An index to the column of object keys is provided in the data base management system so that a search through object keys can later be made to quickly locate particular objects.

The secondary table of FIG. 5 is used to identify the total area on the map plane which is occupied by an object, or in other words all squares on the map plane intersected by an object. The area an object occupies is identified by spatial keys of squares which the object intersects. If an object occupies only one spatial key, identifying and storing data representing an area the object occupies is simple. However, if the object is larger, a determination of spatial keys which it occupies and storing data representing those spatial keys becomes more difficult. For example, an airport can occupy an area of several square miles, potentially intersecting with hundreds of map squares. Similarly, a gas pipeline can meander through a map plane potentially intersecting multiple map squares. To enable data representing an area intersected by an object to be stored more efficiently, ranges are calculated for objects intersecting multiple squares. For example, an airport which occupies the top two rows of squares of the map plane of FIG. 3 is represented by the ranges 20–27 and 36–43, rather than all of the individual spatial keys 20, 21, 22, 23, 24, 25, 26, 27, 36, 37, 38, 39, 40, 41, 42 and 43. Given the coordinates of an object, a processor can calculate ranges of spatial keys for each object. The processor used to calculate ranges can be a special unit utilized to identify and place map data onto a CD-ROM or other storage device, or it can be the processor 100 of FIG. 1.

To identify ranges for the objects, the secondary table of FIG. 5 includes three columns. The first column of the secondary table includes object keys corresponding to object keys stored in the main table. The remaining two columns identify ranges of squares on a map plane intersected by the object identified by the object keys in the first column. Each range is identified by a beginning spatial key provided in a second column and an ending spatial key provided in a third column of the secondary table. For example, object $O_1$ identified by object key $k_3$ in the main table occupies an area intersecting squares of FIG. 3 identified by spatial keys 0, 1, 2, 3, 12, 13, 14 and 15. These spatial keys can also be identified with ranges 0–3 and 12–15. FIG. 5, thus, includes a first row with the object key $k_3$ and beginning spatial key $k_0$ and ending spatial key $k_3$ identifying the range of spatial keys 0–3 from FIG. 3, and a second row with the object key $k_3$ and beginning spatial key $k_{12}$ and ending spatial key $k_{15}$ identifying the range of spatial keys 12–15. The secondary table also includes two ranges for the object key $K_{25}$ which identifies the object $O_2$ in the main table, and one range for object key $k_{50}$ identifying object $O_3$ in the main table and one range for object $k_{62}$ identifying object $O_4$ in the main table. All spatial keys in an identified range intersect with the object identified by the object key stored in the same column of the secondary table. To enable a rapid search of the columns of the secondary table, an index is included in the data base management system for each column.

By using the secondary table in conjunction with the main table to identify object locations, objects can be located without requiring that the objects be stored in a database in relation to their geographic location on a map. Further, with objects occupying as much as 8 kilobytes of memory each, use of object keys and ranges in a secondary table, which occupies much less memory space than the objects alone, enables a more rapid search through the database to locate specific objects.

B. Searching A Database Created Using Space Filling Curves To Find Objects Located In A Given Map Area A user may make a request to find all objects that intersect with a given map area. Such a request is referred to herein as a spatial query. The given search area may be a rectangle or other polygon covering particular squares of the map plane identified by spatial keys. For example, a user may make a spatial query to find all post offices within the area of a map currently projected on his display screen. When the spatial query is made, the map coordinates displayed on the user screen are loaded into the processor 100 of FIG. 1. Similarly, if a spatial inquiry is made for objects in another polygon on the map plane, the coordinates of the polygon relative to the map are loaded into the processor.

To search for objects in the polygon search area identified by coordinates on the map plane, spatial keys on the map intersected by the polygon are identified by the processor. The processor then calculates one or more ranges for the spatial keys intersecting the polygon area. Then for each range of the polygon search area, the processor searches rows of the secondary table in memory for object ranges that have a non-empty intersection with the respective polygon search area range. The results of the search provide a set of object keys from the secondary table identifying objects in the main table that intersect with the polygon search area. The objects can be retrieved from the main table by the processor and displayed to satisfy the users spatial query.

The present invention further provides a second method for performing a spatial query. In the second method, a polygon search area is identified by the user and the processor determines a set of ranges of spatial keys for the polygon search area, as described above. However, instead of searching the secondary table to find object ranges intersecting ranges of the polygon search area, only the beginning spatial key for an object range stored in a column of the secondary table, such as the center column of FIG. 5, is compared by the processor with ranges of the polygon search area to determine if an intersection occurs.

FIG. 6 illustrates that even though a range of a polygon search area $t_1$ through $t_{100}$ and the range of an object $k_1$ through $k_{100}$ intersect, the beginning spatial key $k_1$ of the object range may not intersect the range $_1$–$t_{100}$ of the polygon search area. To assure that such beginning spatial key $k_1$ of the object range does intersect, before a search is performed by the processor the length of ranges for the object keys and the polygon search area ranges are first limited to one hundred spatial keys. If a range would ordinarily be greater than 100, the range is simply divided into two or more ranges. Further, the beginning spatial key in each polygon search area range is reduced in value by 100 as illustrated by the dashed line in FIG. 6. With ranges so adjusted, the beginning spatial key for each object intersecting with the polygon search area will be identified in a search of the secondary table.

However, all objects identified by object keys in a search through the secondary table will now not necessarily intersect with the polygon search area. Thus, after the objects are retrieved from the main table, calculations must be made by the processor using stored coordinates for the objects identified in the search to determine if each object is within the coordinates of the polygon search area. Objects outside the polygon search area are then discarded and the remaining objects can be displayed to satisfy the users spatial query.

C. Searching A Database Created Using Space Filling Curves To Find Objects Nearest A Given Location A user may make a request to find the nearest N objects to a particular location. Such a request is referred to herein as a nearest query. The particular location point to which nearest objects are referenced is defined by a pair of coordinates and is loaded into the processor 100 of FIG. 1. For example, a user may make a spatial query to find the nearest post office to his current location. The user may also make a spatial query to find the nearest three post offices to his current location to give the user a choice if one of the three nearest is closest to an area the user plans to travel after visiting the post office.

The nearest query search method performed by the processor then proceeds in iterations. On each iteration a search area circle of a particular radius is defined by the processor and ranges for the search area are calculated. The initial search area has a radius covering one spatial key only. On each additional iteration the radius of the search area circle is doubled from the previous iteration. Because a circle will not exactly cover a number of squares of a map plane, the search area circle is preferably defined by the processor as a polygon covering substantially the same squares as an actual circle would cover.

For each iteration of the nearest query, the processor compares search area ranges one at a time with the object ranges of the secondary table to determine if one or more intersections occur. Objects are obtained from the main table based on object keys identified in the secondary table when intersections occur, and a record of the objects found is maintained in memory. A record is further kept in memory of all search area ranges compared with the object ranges of the secondary table. If after an iteration the user desired number of nearest objects is not obtained, an additional iteration is performed and search area ranges which have not been previously searched are compared one at a time with object ranges as described above. If after an iteration the user desired number of nearest objects are obtained, no further iterations where the radius is increased are needed.

If exactly the desired number of objects have been identified by the processor after an iteration, the search is complete and the objects located can be displayed.

If more than the desired number of objects are located, the spatial query method, described previously can be used to determine nearest objects within the search area. Using the spatial query method, coordinates of the located objects are retrieved from the object data of the main table, and the distance from the object to the particular location from which the nearest query is made is calculated by the processor. Objects are then sorted from the nearest to farthest from the particular location, and the nearest number of objects desired by the user can be displayed, while the remaining objects are discarded.

A disadvantage in using the spatial query method to locate objects is that if a lot of objects are retrieved after an iteration and only a few are desired by the user, calculations to locate the nearest objects found can be time consuming. For example, if the user is located in a desert over one hundred miles from a major city, and a query is made for the nearest post office, in the first several iterations the search area may not locate any post offices. However, after a number of iterations when the search radius is doubled again, the search radius may eventually identify post offices located throughout the entire city. Potentially a hundred or more objects can then be retrieved identifying post offices, and a significant amount of time will be needed to calculate the nearest object from coordinates of the retrieved objects.

Instead of utilizing the spatial query method during each iteration after the search area ranges are calculated, an optimization method of the present invention can be utilized to more rapidly locate nearest objects.

First in the optimization method, assuming only the one nearest object is desired to be located by the user, in each iteration a processor using the optimization method takes one calculated range of the search area at a time and compares the search area range with the object ranges of the secondary table. When one or more objects in the search area range are found, the objects are retrieved and the search is aborted without searching additional search area ranges for the iteration. The search area radius is then redefined to be the radius to the nearest object located in the aborted search. The radius of the search area circle is redefined to save time because if one desired object is found, it is undesirable to retrieve and calculate distances to objects located at a greater radius. Further, once a search is aborted, ranges already searched are retained in memory, while ranges which have not been searched are discarded. The search areas ranges already compared with the secondary table are saved to prevent the need to compare these ranges with the secondary table a second time as the optimization method proceeds.

The optimization method proceeds with a calculation of ranges for a search area of the circle with the newly defined radius. The search area ranges which have not already been searched are then compared one at a time with object ranges in the secondary table. When one or more additional objects are found in a search area and retrieved from the main table which are closer than the search area radius, the objects are saved and the search is aborted. The search area radius is then redefined to e the radius to the nearest object found in the last aborted search. The new object which is nearest is saved as the nearest and ranges which have been searched are saved, while ranges not searched are discarded. The optimization method then proceeds with calculation of new ranges for the new search radius, comparison of the search area ranges one by one with object ranges of the secondary table and aborting of the search and restarting when necessary in the same manner as described above until all ranges of a search area are compared. The stored nearest object when all remaining ranges of a search area are searched will then be the user requested nearest object and that object can be displayed.

The optimization method of the present invention, thus, iteratively increases search area radius until objects are found, and then iteratively decreases the search area radius to find the nearest object. By iteratively decreasing the search area to eliminate objects after iteratively increasing radius until more than enough objects are found, retrieval of a significant number of objects from the main table and calculation of their locations from a particular search location can be avoided, potentially saving a significant amount of search time during a nearest query.

The optimization method of the present invention proceeds in a similar manner if more than one nearest object is desired by the user. As when one nearest object is requested, when multiple nearest objects are requested, in each iteration a processor using the optimization method takes one calculated range of the search area at a time and compares the search area range with the object ranges of the secondary table. If the desired number of objects is not found, the next search area range is searched. When the desired number of objects or more are obtained after comparison of a search area range, the objects are retrieved and sorted by distance and the search is aborted. Objects in addition to the desired nearest number are discarded from the farthest object located. The search area radius is then redefined to be the radius of the farthest object which is not discarded. As before, results for search area ranges already compared with the secondary table are saved to prevent the need to compare these search area ranges with the secondary table a second time.

The optimization method for multiple nearest objects then proceeds with a calculation of ranges for a search area of the circle with the newly defined radius. The ranges not already searched are compared one at a time with object ranges in the secondary table. When the desired number of objects or more are obtained which are closer than the search area radius, the objects are retrieved and sorted by distance and the search is aborted. Objects in addition to the desired nearest number are discarded from the farthest object located. The search area radius is then redefined to be the radius of the farthest object which is not discarded. The optimization method for multiple nearest objects then proceeds with calculation of new ranges for the new search radius, comparison of the search area ranges one by one with object ranges of the secondary table and aborting of the search and restarting as described above when necessary until all ranges of a search area are compared. The desired number of nearest objects retained in memory when all remaining ranges of a search area are searched will then be the user requested nearest objects, and those objects can be displayed.

As when a single nearest object is requested, when multiple nearest objects are requested the optimization method of the present invention proceeds by iteratively increasing search area radius until the desired number or more of objects are found, and then iteratively decreasing the search area radius to locate only the desired number of objects to reduce overall time for a nearest query.

Although the present invention has been described above with particularity, this was merely to teach one of ordinary skill in the art how to make and use the invention. For example, during a nearest query, instead of doubling the search area radius for each iteration, the radius could be increased by a certain number of squares of the map plane with each iteration. Further, instead of dividing the map plane into squares, the map plane could be divided into other polygon segments such as triangles or rectangles. Many other modifications will fall within the scope of the invention, as that scope is defined by the claims provided below.

What is claimed is:

1. A storage device for storing data for access by an application program which is executable by a processor, the storage device comprising:

a database stored in the storage device for use by the application program to identify objects located in an area of a map plane which is divided into segments, the database including:

a main table including rows with each row storing data identifying one of the objects, and an object key assigned by a space filling curve to one of the segments which is intersected by the area of the object identified in the respective row; and a secondary table including rows with each row storing an object key corresponding to one of the object keys stored in the main table and spatial keys assigned by the space filling curve to segments which are intersected by the area of the object stored in the row of the main table with the corresponding object key, wherein the spatial keys in each row identify only one range of sequential spatial keys assigned by the space filling curve to segments which are intersected by the area of the object identified by the object key of the row, and wherein a plurality of the rows of the secondary table have the same object key identifying the area of a single one of the objects.

2. The storage device of claim 1, wherein the secondary table includes more than one row storing an object key identifying a single one of the objects stored in the main table.

3. A storage device for storing data for access by an application program which is executable by a processor, the storage device comprising:

a database stored in the storage device for use by the application program to identify objects located in an area of a map plane which is divided into segments, the database including:

a main table including rows with each row storing data identifying one of the objects, and an object key assigned by a space filling curve to one of the segments which is intersected by the area of the object identified in the respective row; and a secondary table including rows with each row storing an object key corresponding to one of the object keys stored in the main table and spatial keys assigned by the space filling curve to segments which are intersected by the area of the object stored in the row of the main table with the corresponding object key, wherein the spatial keys included in each row of the secondary table include a beginning spatial key and an ending spatial key from a range of sequential spatial keys assigned by the space filling curve to segments which are intersected by the area of the object identified by the object key of the row.

4. The storage device of claim 3, wherein the ranges of spatial keys identified in the secondary table identify all of the segments intersected by the area of each object identified in the main table.

5. A method utilized by a computer to locate a desired number of objects in an area of a map plane nearest a particular location on the map plane, the map plane being divided into segments with the segments being identified by spatial key numbers assigned using a space filling curve, the method comprising the steps of:

(a) defining a circular search area having an initial radius;

(b) calculating one or more search area ranges of the spatial keys identifying segments of an area of the map plane intersected by the circular search area;

(c) selecting a given one of the search area ranges from the circular search area;

(d) comparing the given search area range with ranges of spatial keys intersected by areas of objects located on the map to identify one or more particular objects having a range of spatial keys intersecting with the given search area range;

(e) determining if a number of the particular objects identified is greater than or equal to the desired number of objects and proceeding to step (f) if not, and proceeding to step (m) if so;

(f) determining if all search area ranges in the circular search area have been compared in step (d) and proceeding to step (g) if not and proceeding to step (h) if so;

(g) selecting one of the search area ranges from the circular search area which has not been compared in step (d) as the given search area range and proceeding to step (d);

(h) redefining the circular search area to have a greater radius and proceeding to step (c);

(i) comparing the given search area range with ranges of spatial keys intersected by areas of objects located on the map to enable identifying one or more given objects having a range of spatial keys intersecting with the given search area range;

(j) determining if a number of the given objects identified is greater than or equal to the desired number of objects and proceeding to step (k) if not, and proceeding to step (m) if so;

(k) determining if all the search area ranges in the circular search area have been compared in step (i) and (d) and if so ending the method with the given objects identifying the desired number of objects, and if not proceeding to step (l);

(l) selecting one of the search area ranges from the circular search area which has not been compared in step (i) or step (d) as the given search area range and proceeding to step (i);

(m) retaining a number of the given objects equal to the desired number of objects which are located nearest in distance to the particular location;

(n) redefining the circular search area to have a radius equal to a distance of a farthest one of the given objects from the particular location;

(o) calculating one or more search area ranges of the spatial keys identifying segments of an area of the map plane intersected by the circular search area; and (p) selecting one of the search area ranges from the circular search area which has not been compared in step (i or (d) as the given search area range and proceeding to step (i).

6. A method utilized by a computer to locate a desired number of objects in an area of a map plane nearest a particular location on the map plane, the map plane being divided into segments with the segments being identified by spatial key numbers assigned using a space filling curve, the method comprising the steps of:

(a) defining a search area having an initial radius;

(b) calculating search ranges of the spatial keys identifying segments of an area of the map plane intersected by the search area;

(c) comparing the search ranges with ranges of spatial keys intersected by areas of the objects located on the map to identify particular ones of the objects in the search area;

(d) determining if a given number of particular objects are identified which is greater than, equal to, or less than the desired number of objects, and proceeding to step (c) if the given number is less than the desired number, proceeding to step (e) if the given number is greater than the desired number, and retaining the particular objects as the desired objects when the given number equals the desired number;

(e) determining a distance of each of the particular objects from the particular location; and (f) retaining a number of the particular objects equal to the desired number of objects which are located nearest in distance to the particular location.

7. The method of claim 6, wherein the ranges of spatial keys intersected by areas of objects located on the map are stored in a secondary table, each range being stored in a row with an object key assigned by a space filling curve to one of the segments intersected by an area of an object, and wherein the objects are stored in a main table, each object being stored in a row with one of the object keys to identify the object.

8. The method of claim 7, wherein in step (c) the search ranges are compared with ranges of spatial keys in the secondary table to identify particular object keys, and a total number of different particular object keys is used to determine the number of the particular objects.

9. The method of claim 8, wherein in step (e) a location of each particular object is determined from object data located in the main table using the particular object keys.

10. A method utilized by a computer to locate a given object in an area of a map plane nearest a particular location on the map plane, the map plane being divided into segments with the segments being identified by spatial key numbers assigned using a space filling curve, the method comprising the steps of:

(a) defining a search area having an initial radius;

(b) calculating search ranges of the spatial keys identifying segments of an area of the map plane intersected by the search area;

(c) comparing the search ranges with ranges of spatial keys intersected by areas of the objects located on the map to identify one or more particular objects in the search area;

(d) determining if one or more of the particular objects is identified and proceeding to step (c) if not, proceeding to step (e) if more than one particular object is identified, and retaining the particular object as the given object when only one of the particular objects is identified;

(e) determining a distance of each of the particular objects from the particular location; and (f) retaining one of the particular objects which is located nearest in distance to the particular location as the given object.

11. A method utilized by a computer to locate given objects in an area of a map plane, the map plane being divided into segments with the segments being identified by spatial key numbers assigned using a space filling curve, the method comprising the steps of:

defining a search area;

calculating search ranges of the spatial keys identifying segments of an area of the map plane intersected by the search area; and comparing the search ranges with only one given spatial key in each range of spatial keys identified by at least one spatial key stored in a database identifying areas of the map occupied by objects to identify the given objects within the search area.

12. The method of claim 11, wherein the given spatial keys are a first spatial key in each of the ranges of spatial keys.

13. A method utilized by a computer to locate a desired number of objects in an area of a map plane nearest a particular location on the map plane, the map plane being divided into segments with the segments being identified by spatial key numbers assigned using a space filling curve, the method comprising the steps of:

(a) defining a search area having an initial radius;

(b) calculating search ranges of the spatial keys identifying segments of an area of the map plane intersected by the search area;

(c) selecting a given one of the search ranges from the search area;

(d) comparing the given search range with ranges of spatial keys intersected by areas of objects located on the map to identify particular objects in the given search range;

(e) determining if a given number of the particular objects are identified which is greater than, equal to, or less than the desired number of objects, and proceeding to step (f) if the given number is less than the desired number, proceeding to step (i) if the given number is greater than the desired number, and retaining the particular objects as the desired objects when the given number equals the desired number;

(f) determining if all search ranges in the search area have been compared in step (d) and proceeding to step (g) if not and proceeding to step (h) if so;

(g) selecting one of the search ranges from the search area which has not been compared in step (d) as the given search range and proceeding to step (d); and (h) redefining the search area to have a greater radius and proceeding to step (c);

(i) retaining a number of the particular objects equal in number to the desired number of objects which are located nearest in distance to the particular location;

(j) defining the search area to have a radius equal to a distance of a farthest one of the retained particular objects from the particular location;

(k) calculating one or more search ranges of the spatial keys identifying segments of an area of the map plane intersected by the search area; and (l) selecting one of the search ranges from the search area which has not been compared in step (d) as the given search range and proceeding to step (d).

14. A method utilized by a computer to locate a given object in an area of a map plane nearest a particular location on the map plane, the map plane being divided into segments with the segments being identified by spatial key numbers assigned using a space filling curve, the method comprising the steps of:

(a) defining a search area having an initial radius;

(b) calculating search ranges of the spatial keys identifying segments of an area of the map plane intersected by the search area;

(c) selecting a given one of the search ranges from the search area;

(d) comparing the given search range with ranges of spatial keys intersected areas of objects located on the map to identify particular objects in the given search range;

(e) determining if one or more of the particular objects is identified and proceeding to step (f) if not, proceeding to step (i) if more than one particular object is identified, and retaining the particular object identified as the given object when only one of the particular objects is identified;

(f) determining if all search ranges in the search area have been compared in step (d) and proceeding to step (g) if not and proceeding to step (h) if so;

(g) selecting one of the search ranges from the search area which has not been compared in step (d) as the given search range and proceeding to step (d);

(h) redefining the search area to have a greater radius and proceeding to step (c);

(i) retaining one of the particular objects which is located nearest in distance to the particular location;

(j) defining the search area to have a radius equal to a distance of the retained particular object from the particular location;

(k) calculating one or more search ranges of the spatial keys identifying segments of an area of the map plane intersected by the search area; and (l) selecting one of the search ranges from the search area which has not been compared in step (d) as the given search range and proceeding to step (d).

* * * * *